(12) United States Patent
Daimon

(10) Patent No.: US 6,346,309 B1
(45) Date of Patent: Feb. 12, 2002

(54) OPTICAL RECORDING MEDIUM AND PROCESS FOR PRODUCING SAME

(75) Inventor: Hideo Daimon, Ibaraki-ken (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/373,078

(22) Filed: Aug. 11, 1999

(30) Foreign Application Priority Data

Aug. 11, 1998 (JP) .......................................... 10-237943

(51) Int. Cl.$^7$ ................................................. B32B 3/02
(52) U.S. Cl. ..................... 428/64.1; 428/65.8; 428/422
(58) Field of Search .............................. 428/64.1, 64.2, 428/64.3, 64.4, 421, 422, 913, 65.4, 65.5, 65.8, 694 BP, 694 BF; 430/270.12, 495.1, 945; 369/283, 288

(56) References Cited

U.S. PATENT DOCUMENTS

| | | | | | |
|---|---|---|---|---|---|
| 5,869,186 | A | * | 2/1999 | Usuki | 428/421 |
| 5,874,169 | A | * | 2/1999 | Falcone | 428/421 |
| 5,914,152 | A | * | 6/1999 | Endo | 427/128 |
| 5,962,141 | A | * | 10/1999 | Falcone | 428/422 |
| 6,136,421 | A | * | 10/2000 | Chen | 428/216 |
| 6,162,521 | A | * | 12/2000 | Falcone | 428/65.4 |

FOREIGN PATENT DOCUMENTS

| | | |
|---|---|---|
| JP | A-2167421 | 6/1990 |
| JP | A-371426 | 3/1991 |
| JP | A-31322 | 8/1991 |
| JP | A-11007657 | 1/1999 |

* cited by examiner

Primary Examiner—Elizabeth Evans
(74) Attorney, Agent, or Firm—Birch, Stewart, Kolasch & Birch, LLP

(57) ABSTRACT

The present invention provides an optical recording medium which is inhibited or prevented from sticking of lubricants onto a light emitting face of a solid immersion lens. The optical recording medium 10 of the present invention comprises a substrate 1 and, provided thereon in succession, a reflective layer 2, a recording layer 4, a protective layer 6 and a lubricating layer 7. The lubricating layer 7 is heated and/or irradiated with ultraviolet rays to adjust the lubricant bonding rate to at least 60%, thereby to reduce the amount of physical adsorptive lubricant contained in the lubricating layer 7. As a result, when recording and reproduction are carried out using a floating type optical head provided with a solid immersion lens, the lubricant hardly sticks to the light emitting face of the solid immersion lens. The lubricant bonding rate can be enhanced to 80% or more by rinsing the lubricating layer with a solvent after the heating and/or the irradiation with ultraviolet rays.

36 Claims, 2 Drawing Sheets

OPTICAL RECORDING MEDIUM AND PROCESS FOR PRODUCING SAME

BACKGROUND OF THE INVENTION

The present invention relates to an optical recording medium for recording and reproduction using a floating type optical head, and a process for producing the same. More particularly, it relates to an optical recording medium which is enhanced in seeking resistance while the floating type optical head seeks through the optical recording medium, and is inhibited or prevented from a lubricant of the optical recording medium from sticking to the slider surface of the floating type optical head and to the light emitting face of a solid immersion lens, and to a process for producing the optical recording medium.

With coming of the multimedia age, optical recording media are widely utilized as media capable of recording and reproducing a large quantity of information such as music, animation images, and data of computers. Optical recording media are classified into read-only type optical recording media capable of only reading of information, such as CD and laser disks, write-once type optical recording media capable of writing only one time, such as CD-R, and rewritable optical recording media capable of rewriting and erasing any number of times.

As one of the rewritable optical recording media, for example, magneto-optical recording media are known. Magneto-optical recording media usually have a structure comprising a transparent substrate and, laminated thereon in succession, a first dielectric layer, a magneto-optical recording layer, a second dielectric layer, a reflective layer and a protective layer, and recording and reproduction are carried out using an optical head and a coil for generation of magnetic field.

Recently, with increase of quantity of information to be handled, further increase of storage capacity is demanded for optical recording media. For meeting the demand, a method is proposed which performs recording and reproduction using a floating type head on which a solid immersion lens (SIL) is mounted. According to this method, recording and reproduction can be performed with a smaller light spot diameter than according to conventional methods, and, hence, recording density per unit area can be increased by about one figure as compares with conventional magneto-optical recording media.

When recording and reproduction are carried out using SIL, a proximate light which oozes from the SIL can be used as a light for recording and reproduction. Since the proximate light decays at a distance of about ¼ the wavelength of the light, the distance between the SIL and the recording layer must be less than ¼ the wavelength of the recording and reproducing light. For example, when a red laser beam of 680 nm in wavelength is used, the distance between the light emitting face of the solid immersion lens and the recording layer must be 170 nm or less. Since thickness of the transparent substrate in conventional magneto-optical recording media is about 1.2 mm, it is difficult for the proximate light to reach the recording layer through the substrate. Therefore, in case a proximate light is used, light is projected into the recording media from the side opposite to the substrate. For this reason, the sequence of lamination for making magneto-optical recording media using a proximate light differs from that of conventional media and usually the former media have a structure comprising a transparent substrate and, laminated thereon in succession, a reflective layer, a first dielectric layer, a magneto-optical recording layer and a second dielectric layer. Furthermore, recording and reproduction are carried out using a floating type optical head, and, therefore, the floating type optical head contacts with the medium when the optical head conducts seeking operation. Therefore, a protective layer and a lubricating layer are formed in succession on the second dielectric layer of the medium in order to enhance seeking resistance.

The present inventors disclose, in JP-A-11-7657, an optical recording medium comprising a substrate and, provided thereon, a reflective layer, a recording layer and a dielectric layer and irradiated with a recording light or reproducing light from the side of the dielectric layer, in which a protective layer having self-lubricating property is provided on the dielectric layer and a lubricating layer is further provided on the protective layer. As compounds constituting the lubricating layer, there are disclosed perfluoro polyethers having one hydroxyl group, carboxyl group, ester group or piperonyl group at least one end of the molecule because of their large adsorption energy to the protective layer comprising carbon.

However, when a floating type optical head seeks through the magneto-optical recording medium, there is the possibility of a part of the lubricant being vaporized by the heat of laser beams to move and stick to the light emitting face of SIL or the SIL sliding over the lubricant to cause moving and sticking of the lubricant to the light emitting face of the SIL. If the lubricant moves and sticks to the light emitting face of SIL, optical characteristics of SIL are changed and recording and reproduction cannot be satisfactorily performed. As the causes therefor, the following can be considered. That is, lubricant for optical recording media according to optical recording system using SIL has a high transparency, being different from the lubricant for magnetic recording media according to magnetic recording system such as magnetic tape and magnetic disk, but the lubricant which moves and sticks to the light emitting face of SIL is decomposed with heat of laser beams and changes in its properties to deteriorate the transparency. Thus, it is desired to coat the protective layer with a lubricant which is further improved in adsorption property to the protective layer than the lubricant disclosed in JP-A-11-7657.

SUMMARY OF THE INVENTION

The present invention has solved the above problems, and the object is to provide an optical recording medium which is inhibited or prevented from moving and sticking of lubricant to the light emitting face of an optical element such as SIL and can realize recording and reproduction using SIL.

Another object of the present invention is to provide an optical recording medium in which the lubricating layer comprises a lubricant which is not heat decomposed even if heated by irradiation with light beams and maintains a high transparency.

Still another object of the present invention is to provide a process for producing an optical recording medium in which the lubricant hardly moves and sticks to a light emitting face of optical elements such as SIL and which has a lubricating layer high in sliding resistance.

According to the first embodiment of the present invention, there is provided an optical recording medium comprising a substrate and, provided thereon in succession, a reflective layer, a recording layer, a protective layer and a lubricating layer comprising a lubricant, characterized in that a lubricant bonding rate of the lubricant to the protective layer is 60–100%.

One example of the structure of the optical recording medium according to the present invention is shown in FIG. 1. The optical recording medium 10 comprises a substrate 1 and, provided thereon in succession, a reflective layer 2, a first dielectric layer 3, a recording layer 4, a second dielectric layer 5, a protective layer 6 and a lubricating layer 7. As shown in FIG. 1, the lubrication layer 7 comprises a bonding lubricating layer 8 present on the protective layer 6 with bonding to the protective layer and a physical adsorptive lubricating layer 9 present on the bonding lubricating layer 8 and not bonded to the protective layer. As for the lubricating layer, it is known that this layer is also formed on the uppermost layer of conventional magnetic disks in order to reduce wear of the magnetic disk caused by magnetic head. The lubricant bonding rate is known as a measure for expressing the degree of bonding of such lubricating layer to a surface on which the lubricating layer is coated (for example, a protective layer). The lubricant bonding rate is expressed by the proportion of the bonding lubricating layer in the lubricating layer. In this specification, the lubricant bonding rate is numerically expressed in the following manner. Thickness of the lubricating layer is referred to as A, and thickness of the lubricating layer after the lubricating layer and the substrate including the coated surface or the information recording medium has been subjected to ultrasonic cleaning for 30 seconds in a solvent is referred to as B. In this case, the lubricant bonding rate is expressed by $B/A \times 100\%$. According to the inventors' investigation, it is found that the lubricant bonding rate of a magnetic disk is usually 30–50%.

The optical recording medium according to the first embodiment of the present invention is characterized in that the lubricant bonding rate of the lubrication layer is increased to 60% or more, considering the theory of recording and reproducing using the optical recording medium by the optical head. That is, since the lubricant bonding rate is 60% or more, amount of physical adsorptive lubricant on the bonding lubricant is small. Therefore, even in the case of optical recording and reproducing system by which the recording and reproduction are carried out with the optical head and the recording surface being in close vicinity to each other, for example, with the distance therebetween being 100 nm or less, such as the system of using a floating type optical head with an SIL mounted thereon, the physical adsorptive lubricant can be prevented or inhibited from moving and sticking to the light emitting face of the SIL. Furthermore, when the floating type optical head mounting an SIL seeks through the optical recording medium, the floating type optical head does not directly contact with the protective layer due to the presence of the bonded lubricant component, and thus the endurance of the optical recording medium can be further enhanced.

It is preferred that the lubricating layer comprises a perfluoro polyether lubricant having alcohol group, carboxyl group, ester group or piperonyl group at one or both ends of the molecule and having a molecular weight of 2000–10000. If the molecular weight is less than 2000, lubrication effect is insufficient and, besides, the lubricant is apt to be vaporized with increase of temperature. If the molecular weight exceeds 10000, viscosity of the lubricant increases to increase frictional coefficient and it becomes difficult to satisfactorily slide the optical head over the optical recording medium. Furthermore, perfluoro polyethers of 2000–10000 in molecular weight have a heat decomposition temperature of about 350° C., and shows no absorption of light in visible light region when used in optical recording systems. Therefore, the lubricants can fulfill the functions as lubricants without deterioration of optical properties in optical systems.

In addition to the above lubricants, perfluoro polyethers in which one end group or both end groups of the molecule have two or more hydroxyl groups can be used as lubricants. These perfluoro polyether lubricants preferably have a molecular weight of 2000–10000. These lubricants include, for example, perfluoro polyethers represented by $HO-CH_2CH(OH)CH_2OCH_2CF_2O-(C_2F_4O)_n-(CF_2O)_m-CF_2CH_2-CH(OH)CH_2OH$. In this formula, n and m are optionally selected so that the molecular weight of the perfluoro polyethers can be within the range of 2000–10000, and, for example, n and m may be nearly equal.

In order to further increase the endurance by bonding the lubricant to the protective layer, it is preferred that after the lubricating layer is formed on the protective layer, this is heated at a temperature in the range of 50–120° C. or is irradiated with ultraviolet rays of 185–254 nm in wavelength, for example, ultraviolet rays of 185 nm and/or 254 nm which are usable at present, in the air or in an inert atmosphere. The bonding of the lubricant to the protective layer can be further accelerated by carrying out the heating and the irradiation with ultraviolet rays in combination.

In order to inhibit moving and sticking of the lubricant to the solid immersion lens as much as possible, the lubricant bonding rate is preferably 80% or more. For increasing the lubricant bonding rate to 80% or more, for example, the lubricating layer is formed on the protective layer and thereafter they can be rinsed with a solvent in addition to the heating and the irradiation with ultraviolet rays.

According to the second embodiment of the present invention, there is provided an optical recording medium comprising a substrate and, provided thereon in succession, a reflective layer, a recording layer, a protective layer and a lubricating layer comprising a lubricant, characterized in that the lubricant is a perfluoro polyether in which at least one end group of the molecule has at least two hydroxyl groups.

The optical recording medium according to the second embodiment of the present invention is characterized in that a perfluoro polyether in which one or both end groups of the molecule have two or more hydroxyl groups is used as a lubricant molecule, considering the theory of recording and reproducing using the optical recording medium by a floating type optical head. The perfluoro polyethers having two or more hydroxyl groups in one or both end groups of the lubricant molecule are twice or more in the number of functional groups as compared with those having one hydroxyl group in one or both end groups of the molecule disclosed in JP 11-7657 A, and, hence, are increased about twice or more in adsorptivity to the carbon protective film used as the protective layer. Thanks to this increase of adsorptivity of the lubricant molecule, sliding resistance increases, and frictional coefficient of the medium surface can be lowered and damaging of the medium surface (scratches by sliding) in seeking can be inhibited.

Figure 1:
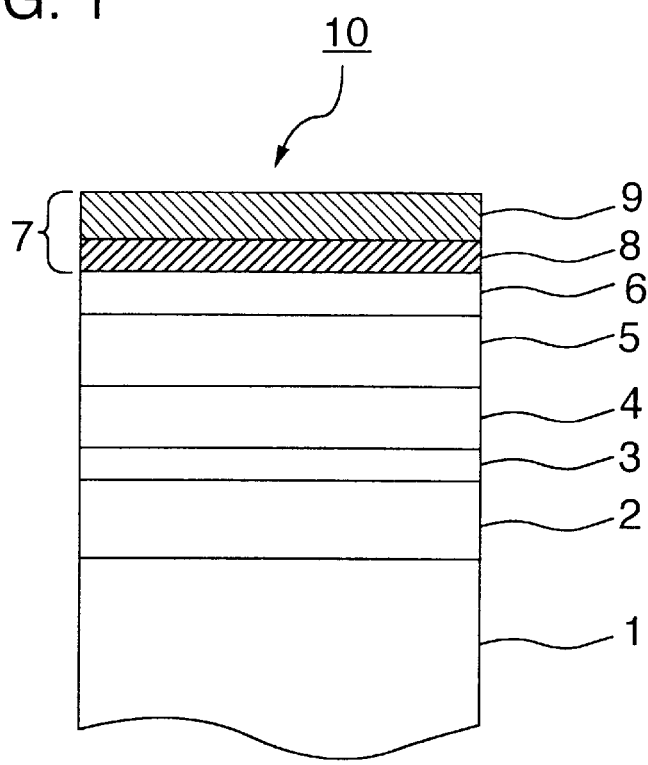
FIG. 1 is a schematic sectional view of an optical recording medium in which recording and reproduction are performed using a floating type optical head.

In these drawings, the reference numerals show the following members.

1: Substrate
2: Reflective layer
3: First dielectric layer
4: Recording layer
5: Second dielectric layer
6: Protective layer
7: Lubricating layer
8: Bonding lubricating layer
9: Physical adsorptive lubricating layer
10, 20: Magneto-optical recording media
100: Solid immersion lens

DETAILED DESCRIPTION OF THE INVENTION

The perfluoro polyether lubricants used in the present invention are preferably those which have a molecular weight of 2000–10000. When the molecular weight is 2000 or more, the lubricating effect is further improved, and, besides, vaporization due to rising of temperature can be inhibited. Furthermore, when the molecular weight is less than 10000, increase of frictional coefficient due to the increase of viscosity of the lubricant can be inhibited and satisfactory sliding characteristics of the floating type optical head over the optical recording medium can be secured.

As the perfluoro polyether lubricants, preferred are perfluoro polyethers in which the main chain is —$(C_2F_4O)_n$—$(CF_2O)_m$— and each of both end groups of the molecule has two OH groups, such as those represented by HO—$CH_2CH(OH)CH_2OCH_2CF_2O$—$(C_2F_4O)_n$—$(CF_2O)_m$—$CF_2CH_2OCH_2CH(OH)CH_2OH$. These perfluoro polyethers are available in trademark of Fomblin-Z-Tetraol from Audimont Co., Ltd. In the above formula, n and m are optionally selected so that the molecular weight of the perfluoro polyethers can be within the range of 2000–10000, and, for example, n and m may be nearly equal.

As another example of the perfluoro polyether lubricants, preferred are perfluoro polyethers in which the main chain is $F(C_3F_6O)_p$— and one of end groups of the molecule has two OH groups, such as those represented by $F(C_3F_6O)_p$—$C_2F_4CH_2OCH_2CH(OH)$ $CH_2OH$ and $F(C_3F_6O)_p$—$C_2F_4CH(OH)_2$. In these formulas, p is optionally selected so that the molecular weight of the perfluoro polyethers can be within the range of 2000–10000.

As in the case of the optical recording medium according to the first embodiment, in the optical recording medium according to the second embodiment of the present invention, in order to further increase the endurance by bonding the lubricant to the protective layer, it is preferred that after the lubricating layer is formed on the protective layer, this is heated at a temperature of 50–120° C. or are irradiated with ultraviolet rays of 185–254 nm in wavelength, for example, ultraviolet rays of 185 nm and/or 254 nm which are usable at present, in an inert atmosphere.

In the optical recording medium according to the second embodiment of the present invention, the lubricant bonding rate is more preferably 60–80% for the reason that moving and sticking of the lubricant on the optical recording medium to the slider of the floating type optical head and to the light emitting face of SIL should be inhibited as much as possible. The lubricant bonding rate of 60–80% can be obtained by controlling the heat treating temperature and time, or the ultraviolet ray irradiation time.

The protective layer of the optical recording media according to the first and second embodiments can comprise carbon. The carbon can contain at least one element selected from the group consisting of hydrogen, nitrogen, silicon and fluorine. For example, the protective layer may comprise hydrogen-containing carbon, nitrogen-containing carbon, silicon-containing carbon, fluorine-containing carbon, hydrogen and nitrogen-containing carbon, hydrogen and fluorine-containing carbon, or hydrogen, fluorine and silicon-containing carbon. Since by using these materials, the floating type optical head satisfactorily slides over the optical recording medium, formation of sliding scratches on the surface of the medium is inhibited or prevented. Moreover, thickness of the protective film is preferably 5–100 nm. If the thickness of the protective film is less than 5 nm, the coating is not sufficient and if it exceeds 100 nm, the distance between the recording layer and the optical head increases, and recording and reproduction cannot be realized using a proximate light.

The optical recording media of the present invention include any of read-only type optical recording media which reproduce information depending on the presence or absence of rugged pits or holes or the difference in reflectance of crystalline phase and amorphous layer, such as CD, CD-ROM and DVD-ROM, write-once type optical recording media which record information by making holes in organic dye layers or inorganic material layers such as Te compound by laser beams, such as CD-R, magneto-optical recording media using as a recording layer an alloy layer of rare earth metals and transition metals, such as TbFeCo and DyFeCo, and rewritable type optical recording media such as phase-changing type optical recording media in which a recording film such as Ge alloy and In alloy can be reversibly changed between crystalline phase and amorphous phase by irradiation with light.

The substrate used in the optical recording media of the present invention include, for example, resin substrates such as of polycarbonates, polyolefins, polymethyl acrylates, polystyrenes and nylons, glass substrates, and metal substrates such as of silicon, thermally oxidized silicon, Al and Ti.

According to the third embodiment of the present invention, there is provided a process for producing an optical recording medium comprising a substrate and, provided thereon in succession, a reflective layer, a recording layer, a protective layer and a lubricating layer, characterized in that a lubricant is coated on the protective layer, and, thereafter, the lubricant is subjected to at least one of heating and irradiation with ultraviolet rays so that the lubricant bonding rate of the lubricant to the protective layer is in the range of 60–100%, thereby to form the lubricating layer.

According to the production process of the present invention, a lubricant is coated on the protective layer, and then the lubricating layer is formed by heating or ultraviolet ray irradiation, whereby the lubricant bonding rate of the lubrication layer can be made to 60–100%. The heating and the irradiation with ultraviolet rays can be carried out in combination, whereby bonding of the lubricant to the protective layer is further accelerated. The heating temperature in the present invention is preferably in the range of 50–120° C. If the heating temperature is lower than 50° C., the bonding reaction of the lubricant to the protective layer does not sufficiently proceed, and if it exceeds 120° C., the substrate is distorted by the heat.

The lubricants to be coated on the protective layer are, for example, perfluoro polyethers. It is preferred for the perfluoro polyethers that at least one of end groups of the molecule has two or more hydroxyl groups. Molecular weight of the perfluoro polyethrs is preferably 2000–10000. Preferred examples are perfluoro polyethers represented by HO—$CH_2CH(OH)CH_2OCH_2CF_2O$—$(C_2F_4O)_n$—$(CF_2O)_m$—$CF_2CH_2OCH_2CH(OH)CH_2OH$. In the formula, n and m are optionally selected so that the molecular weight of the perfluoro polyethers can be within the range of 2000–10000, and, for example, n and m may be nearly equal.

As the ultraviolet rays used for irradiation, here may be used those of 185–254 nm, for example, ultraviolet ray of 185 nm or 254 nm in wavelength which is usable at present. These two ultraviolet rays can be used in combination. When irradiation with ultraviolet rays is carried out in the air, especially the ultraviolet ray of 185 nm in wavelength produces active oxygen, which decomposes lubricant, and the irradiation with the ultraviolet ray is preferably carried out in an inert atmosphere. As the inert atmosphere, preferred are, for example, nitrogen atmosphere, argon atmosphere and helium atmosphere.

Moreover, in the production process of the present invention, it is preferred to rinse the optical recording medium with a solvent. By this rinsing, the physical adsorptive lubricant which has not bonded to the protective layer is removed and amount of the physical adsorptive lubricant in the lubrication layer decreases. Thus, proportion of the bonding lubricant in the lubricating layer relatively increases. That is, consequently, the lubricant bonding rate is increased. The solvents used for rinsing of the optical recording medium include, for example, perfluorooctane ($C_8F_{18}$), perfluorohexane ($C_6F_{14}$), $C_4F_9OCH_3$ (trademark HFE-7100 available from 3M Co.), $C_4F_9OC_2H_5$ (trademark HFE-7200 available from 3M Co.), and GARDEN (manufactured by Audimont Co., Ltd.).

DESCRIPTION OF THE PREFERRED EMBODIMENTS

Embodiments and examples of the optical recording media of the present invention will be explained specifially. First, explanation will be made of an example of the optical recording medium according to the first embodiment of the present invention.

Production Example 1

Figure 2:
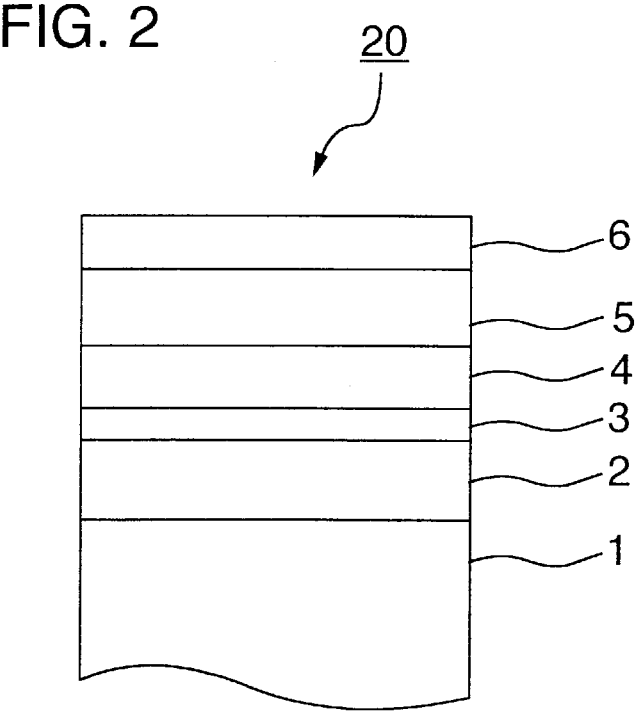
FIG. 2 is a schematic sectional view of an optical recording medium produced in Production Example 1.

In this production example, the magneto-optical recording medium 20 having the sectional structure shown in FIG. 2 was produced. The magneto-optical recording medium 20 has the structure comprising a substrate 1 and a reflective layer 2, a first dielectric layer 3, a recording layer 4, a second dielectric layer 5 and protective layer 6 which are laminated in succession on the substrate 1. Production of the magneto-optical recording medium 20 of such structure will be shown below.

First, a stamper on which rugged patterns corresponding to lands and grooves were formed was charged in a mold of an injection molding machine, and a polycarbonate resin material was injection molded in the mold to make a polycarbonate substrate 1. Then, the resulting polycarbonate substrate 1 was loaded in a DC magnetron sputter apparatus, and a film of AlTi of 50 nm thick was formed as the reflective layer 2 on the polycarbonate substrate 1 by sputtering. Subsequently, a film of $SiN_x$ of 30 nm thick was formed as the first dielectric layer 3 on the reflective layer 2, and successively a film of TbFeCo of 20 nm thick was formed as the recording layer 4. Thereafter, a film of $SiN_x$ of 80 nm thick was formed as the second dielectric layer 5, and a film of carbon of 10 nm thick was formed as he protective layer 6. Sputtering conditions for sputtering these layers 2–6 were as follows. For formation of the film of the reflective layer 2, an AlTi alloy was used as a target material, and Ar gas was used at a pressure of $5\times10^{-3}$ Torr as a sputtering atmosphere. For formation of the films of the first dielectric layer 3 and the second dielectric layer 5, Si was used as a target material, and Ar+$N_2$ gas was used at a pressure of $7\times10^{-3}$ Torr as a sputtering atmosphere. For formation of the film of the recording layer 4, TbFeCo was used as a target material, and Ar gas was used at a pressure of $5\times10^{-3}$ Torr as a sputtering atmosphere. For formation of the film of the protective layer 6, carbon was used as a target material, and Ar gas was used at a pressure of $5\times10^{-3}$ Torr as a sputtering atmosphere. The thus obtained magneto-optical recording medium was referred to as sample 1.

Production Example 2

A magneto-optical recording medium was produced in the same manner as in Production Example 1, except that Ar+$H_2$ gas was used as the sputtering atmosphere gas in the sputtering of the protective layer 6, and a hydrogen-containing carbon protective layer was formed as the protective layer 6. The thus obtained magneto-optical recording medium was referred to as sample 2.

Production Example 3

A magneto-optical recording medium was produced in the same manner as in Production Example 1, except that Ar+$CH_4$ gas was used as the sputtering atmosphere gas in the sputtering of the protective layer 6, and a hydrogen-containing carbon protective layer was formed as the protective layer 6. The thus obtained magneto-optical recording medium was referred to as sample 3.

Production Example 4

A magneto-optical recording medium was produced in the same manner as in Production Example 1, except that Ar+$N_2$ gas was used as the sputtering atmosphere gas in the sputtering of the protective layer 6, and a nitrogen-containing carbon protective layer was formed as the protective layer 6. The thus obtained magneto-optical recording medium was referred to as sample 4.

Production Example 5

A magneto-optical recording medium was produced in the same manner as in Production Example 1, except that Ar+$N_2$+$H_2$ gas was used as the sputtering atmosphere gas in the sputtering of the protective layer 6, and a hydrogen and nitrogen-containing carbon protective layer was formed as the protective layer 6. The thus obtained magneto-optical recording medium was referred to as sample 5.

Production Example 6

A magneto-optical recording medium was produced in the same manner as in Production Example 1, except that a hydrogen-containing carbon (diamond-like carbon) protective layer was formed as the protective layer 6 on the second dielectric layer by a plasma CVD method using a high frequency of 13.56 MHz and using methane as a monomer gas and hydrogen as a carrier gas. The thus obtained magneto-optical recording medium was referred to as sample 6.

Production Example 7

Samples 1–6 were produced in the same manner as in Production Examples 1–6, and on the protective layer of each sample was formed a lubricating layer by coating at a thickness of 2 nm a perfluoro polyether lubricant (a) having $F(C_3F_6O)_n$— as a main chain and an alcohol as an end functional group and having an average molecular weight of 7000 by a dip coater.

Production Example 8

Samples 1–6 were produced in the same manner as in Production Examples 1–6, and on the protective layer of each sample was formed a lubricating layer by coating at a thickness of 2 nm a perfluoro polyether lubricant (b) having $F(C_3F_6O)_n$— as a main chain and a carboxyl group as an end functional group and having an average molecular weight of 4000 by a dip coater.

Production Example 9

Samples 1–6 were produced in the same manner as in Production Examples 1–6, and on the protective layer of each sample was formed a lubricating layer by coating at a thickness of 2 nm a perfluoro polyether lubricant (c) having $F(C_3F_6O)_n$— as a main chain and ester groups (—$C_2F_4COOCH_3$, —$C_2F_4CH_2COOCH_3$) as end functional groups and having an average molecular weight of 4000 by a dip coater.

Production Example 10

Samples 1–6 were produced in the same manner as in Production Examples 1–6, and on the protective layer of each sample was formed a lubricating layer by coating at a thickness of 2 nm a perfluoro polyether lubricant (d) having $F(C_3F_6O)_n$— as a main chain and a piperonyl group as an end functional group and having an average molecular weight of 4400 by a dip coater.

Production Example 11

Samples 1–6 were produced in the same manner as in Production Examples 1–6, and on the protective layer of each sample was formed a lubricating layer by coating at a thickness of 2 nm a perfluoro polyether lubricant (e) having —$(C_2F_4O)_n(CF_2O)_m$— as a main chain and an alcohol group as an end functional group and having an average molecular weight of 5000 by a dip coater.

Production Example 12

Samples 1–6 were produced in the same manner as in Production Examples 1–6, and on the protective layer of each sample was formed a lubricating layer by coating at a thickness of 2 nm a perfluoro polyether lubricant (f) having —$(C_2F_4O)_n(CF_2O)_m$— as a main chain and ester groups (—$C_2F_4COOCH_3$, —$C_2F_4CH_2COOCH_3$) as end functional groups and having an average molecular weight of 4000 by a dip coater.

Production Example 13

Samples 1–6 were produced in the same manner as in Production Examples 1–6, and on the protective layer of each sample was formed a lubricating layer by coating at a thickness of 2 nm a perfluoro polyether lubricant (g) having —$(C_2F_4O)_n(CF_2O)_m$— as a main chain and a carboxyl group as an end functional group and having an average molecular weight of 4000 by a dip coater.

Production Example 14

Samples 1–6 were produced in the same manner as in Production Examples 1–6, and on the protective layer of each sample was formed a lubricating layer by coating at a thickness of 2 nm a perfluoro polyether lubricant (h) having —$(C_2F_4O)_n(CF_2O)_m$— as a main chain and a piperonyl group as an end functional group and having an average molecular weight of 3200 by a dip coater.

The lubricants (a)–(h) used in the above Production Examples 7–14 are shown in the following Table 1, and the media and the lubricants used in the Production Examples 1–14 are shown in the following Table 2.

TABLE 1

| Lubricant | Main chain | End functional group | Average molecular weight |
|---|---|---|---|
| a | $F(C_3F_6O)_n$— | Alcohol | 7000 |
| b | $F(C_3F_6O)_n$— | Carboxyl | 4000 |
| c | $F(C_3F_6O)_n$— | Ester | 4000 |
| d | $F(C_3F_6O)_n$— | Piperonyl | 4400 |
| e | —$(C_2F_4O)_n(CF_2O)_m$— | Alcohol | 5000 |
| f | —$(C_2F_4O)_n(CF_2O)_m$— | Ester | 4000 |
| g | —$(C_2F_4O)_n(CF_2O)_m$— | Carboxyl | 4000 |
| h | —$(C_2F_4O)_n(CF_2O)_m$— | Piperonyl | 3200 |

TABLE 2

| Production Example | Medium | Lubricant |
|---|---|---|
| 7 | Samples 1~6 | a |
| 8 | Samples 1~6 | b |
| 9 | Samples 1~6 | c |
| 10 | Samples 1~6 | d |
| 11 | Samples 1~6 | e |
| 12 | Samples 1~6 | f |
| 13 | Samples 1~6 | g |
| 14 | Samples 1~6 | h |

Example 1

The surface of each of the magneto-optical recording media produced in the same manner as in Production Example 7–14 was subjected to heat treatment at 100° C. for 12 hours using a thermostatic chamber in the air.

Example 2

The surface of each of the magneto-optical recording media produced in the same manner as in Production Examples 7–14 was irradiated with ultraviolet rays for 15 minutes using a low pressure mercury lamp emitting an ultraviolet ray of 254 nm in wavelength. Irradiation power of the ultraviolet ray was 200 W.

Example 3

The surface of each of the magneto-optical recording media produced in the same manner as in Production Examples 7–14 was irradiated with ultraviolet rays for 15 minutes in a nitrogen atmosphere using a low pressure mercury lamp emitting ultraviolet rays of 185 nm and 253 nm in wavelength. Irradiation power of the ultraviolet rays was 200 W.

Example 4

The surface of each of the magneto-optical recording media produced in the same manner as in Production Examples 7–14 was irradiated with ultraviolet rays for 15 minutes in the air using a low pressure mercury lamp emitting ultraviolet ray of 254 nm in wavelength under heating at 100° C. using an infrared lamp. Irradiation power of the ultraviolet ray was 200 W.

Example 5

The surface of each of the magneto-optical recording media produced in the same manner as in Production Examples 7–14 was irradiated with ultraviolet rays for 15 minutes in a nitrogen atmosphere using a low pressure mercury lamp emitting ultraviolet rays of 185 nm and 253 nm in wavelength under heating at 100° C. using an infrared lamp. Irradiation power of the ultraviolet rays was 200 W. Thus, magneto-optical recording media according to the first embodiment of the present invention were obtained.

Measurement of Thickness of the Lubricating Layer and Calculation of the Lubricant Bonding Rate Thickness of the lubricating layer of the magneto-optical recording media produced in Examples 1–5 was measured in the following manner using X-ray photo-electron spectroscopy (XPS) and lubricant bonding rate was calculated. First, two samples of 5 mm×5 mm for analysis were cut out from each of the magneto-optical recording media at the position of 40 mm from the center in radial direction. One of the samples, as it was, was analyzed by XPS to measure thickness of the lubricant film. Another sample was subjected to ultrasonic cleaning by an ultrasonic cleaner manufactured by Luchi Co., Ltd. (Model VS-100). The ultrasonic cleaning was carried out for 30 seconds at a frequency of 50 kHz and an output of 100 W using perfluorooctane: $C_8F_{18}$ as a solvent. Then, each of the samples after ultrasonic cleaning was subjected to XPS analysis to measure the thickness of the lubricating layer. The results of measurement are shown in the following Table 3. In Table 3, the lubricant bonding rate is defined to be B/A×100% in which thickness of the lubricating layer before ultrasonic cleaning is A and thickness of the lubricating layer after ultrasonic cleaning is B. The lubricant bonding rates of the lubricating layers of the magneto-optical recording media of Examples 1–5 were all 60% or higher.

TABLE 3

|  | A (nm) | B (nm) | B/A × 100% |
|---|---|---|---|
| Example 1 | 2.00 | 1.20 | 60 |
| Example 2 | 2.00 | 1.30 | 65 |
| Example 3 | 2.00 | 1.50 | 75 |
| Example 4 | 2.00 | 1.50 | 75 |
| Example 5 | 2.00 | 1.58 | 79 |
| Comparative Example 1 | 2.00 | 0.40 | 20 |
| Comparative Example 2 | 2.00 | 0.60 | 30 |

Comparative Example 1

Thickness of the lubricating layer of the magneto-optical recording media which were produced in the same manner as in Production Examples 7–14 and were not subjected to any after-treatment was measured in the same manner as above using XPS, and the lubricant bonding rate was calculated in the same manner as above. The lubricant bonding rates were low, namely, about 20%. The results are shown in Table 3.

Comparative Example 2

Sample 1 was produced in the same manner as in Production Example 1, and a lubricating layer was formed on the protective layer of the sample 1 by coating oleic acid ($C_{18}H_{34}O_2$) by a dip coater. Thickness of the lubricating layer of the resulting magneto-optical recording medium was measured in the same manner as above using XPS, and the lubricant bonding rate was calculated. The lubricant bonding rate was low, namely, about 30%. The results are shown in Table 3.

Examples 6–10

The magneto-optical recording media obtained in Example 1–5 were subjected to rinsing treatment by immersing in a tank filled with a solvent (perfluorooctane: $C_8F_{18}$). The media used in Examples 6–10 are shown in Table 4.

TABLE 4

| Example | After-treatment |
|---|---|
| 6 | Rinsing of medium of Example 1 with solvent |
| 7 | Rinsing of medium of Example 2 with solvent |
| 8 | Rinsing of medium of Example 3 with solvent |

TABLE 4-continued

| Example | After-treatment |
|---|---|
| 9 | Rinsing of medium of Example 4 with solvent |
| 10 | Rinsing of medium of Example 5 with solvent |

Thickness of the lubricating layer of the magneto-optical recording media of Examples 6–10 which were subjected to the rinsing treatment was measured in the same manner as above using XPS, and the lubricant bonding rate was calculated. The results are shown in Table 5. All the magneto-optical recording media of Examples 6–10 had high lubricant bonding rates of higher than 80%. It is considered that this is because they were previously subjected to the rinsing treatment with solvent, and, hence, the physical adsorptive lubricant present on the surface of the lubricating layer was removed, resulting in increase of the lubricant bonding rate.

TABLE 5

| Example | A (nm) | B (nm) | B/A × 100% |
|---|---|---|---|
| 6 | 1.30 | 1.07 | 82 |
| 7 | 1.40 | 1.18 | 84 |
| 8 | 1.60 | 1.38 | 86 |
| 9 | 1.60 | 1.44 | 90 |
| 10 | 1.80 | 1.66 | 92 |

The magneto-optical recording media obtained in Example 1–10 and Comparative Examples 1 and 2 were subjected to a recording and reproducing test for continuously 24 hours with carrying out seeking by a floating type slider in which a solid immersion lens made of zirconia and having a diameter of 80 μm and a refractive index of 2.2 was embedded. The height of the floating type slider from the media was kept at about 100 nm. After termination of the recording and reproducing test, contamination of the light emitting face of the solid immersion lens (SIL) was examined by a light microscope. The results are shown in Table 6.

TABLE 6

| Medium | Contamination of SIL |
|---|---|
| Magneto-optical recording medium obtained in Example 1 | Slight |
| Magneto-optical recording medium obtained in Example 2 | Slight |
| Magneto-optical recording medium obtained in Example 3 | Slight |
| Magneto-optical recording medium obtained in Example 4 | Slight |
| Magneto-optical recording medium obtained in Example 5 | Slight |
| Magneto-optical recording medium obtained in Example 6 | No |
| Magneto-optical recording medium obtained in Example 7 | No |
| Magneto-optical recording medium obtained in Example 8 | No |
| Magneto-optical recording medium obtained in Example 9 | No |
| Magneto-optical recording medium obtained in Example 10 | No |
| Magneto-optical recording medium obtained in Comparative Example 1 | A large amount of lubricant stuck to the whole light emitting face of SIL |

TABLE 6-continued

| Medium | Contamination of SIL |
| --- | --- |
| Magneto-optical recording medium obtained in Comparative Example 2 | A large amount of lubricant stuck to the whole light emitting face of SIL |

In the magneto-optical recording media subjected to heat treatment or ultraviolet ray treatment (Examples 1–5), sticking of the lubricant to SIL was slight. On the other hand, in the magneto-optical recording media which were not subjected to heat treatment or ultraviolet ray treatment (Comparative Examples 1 and 2), a large amount of the lubricant stuck to the light emitting face of SIL. Furthermore, in the magneto-optical recording media subjected to heat treatment or ultraviolet ray treatment and thereafter to rinsing treatment (Examples 6–10), there was observed substantially no sticking of the lubricant to SIL. It is considered that this is because the physical adsorptive lubricant remaining on the surface of the lubricating layer was removed by the rinsing treatment.

Measurement of heat decomposition temperature

In the case of magneto-optical recording and reproducing systems, the lubricants are required to have heat resistance because the media are heated by irradiation with light beams. In order to examine the influence of heat decomposition of the lubricant caused by irradiation with light beams, temperature at which the heat decomposition starts (heat decomposition temperature) was measured, by a thermobalance, on the perfluoro polyether lubricants (a)–(h) of Production Examples 7–14 and the lubricant used in Comparative Example 2 (oleic acid). As a result of the measurement, the perfluoro polyether lubricants (a)–(h) of Production Examples 7–14 all had a heat decomposition temperature of 350° C. or higher. On the other hand, oleic acid used in Comparative Example 2 had a heat decomposition temperature of 200° C. Magneto-optical recording media are usually heated to 280–300° C. by the irradiation with light beams at the time of recording and reproducing. Therefore, it is considered that in the case of the magneto-optical recording medium of Comparative Example 2 in which oleic acid was used as the lubricant, heat decomposition of the lubricant took place to cause light absorption, and, as a result, optical characteristics at the time of recording and reproducing were deteriorated.

Random seeking test

Figure 3:
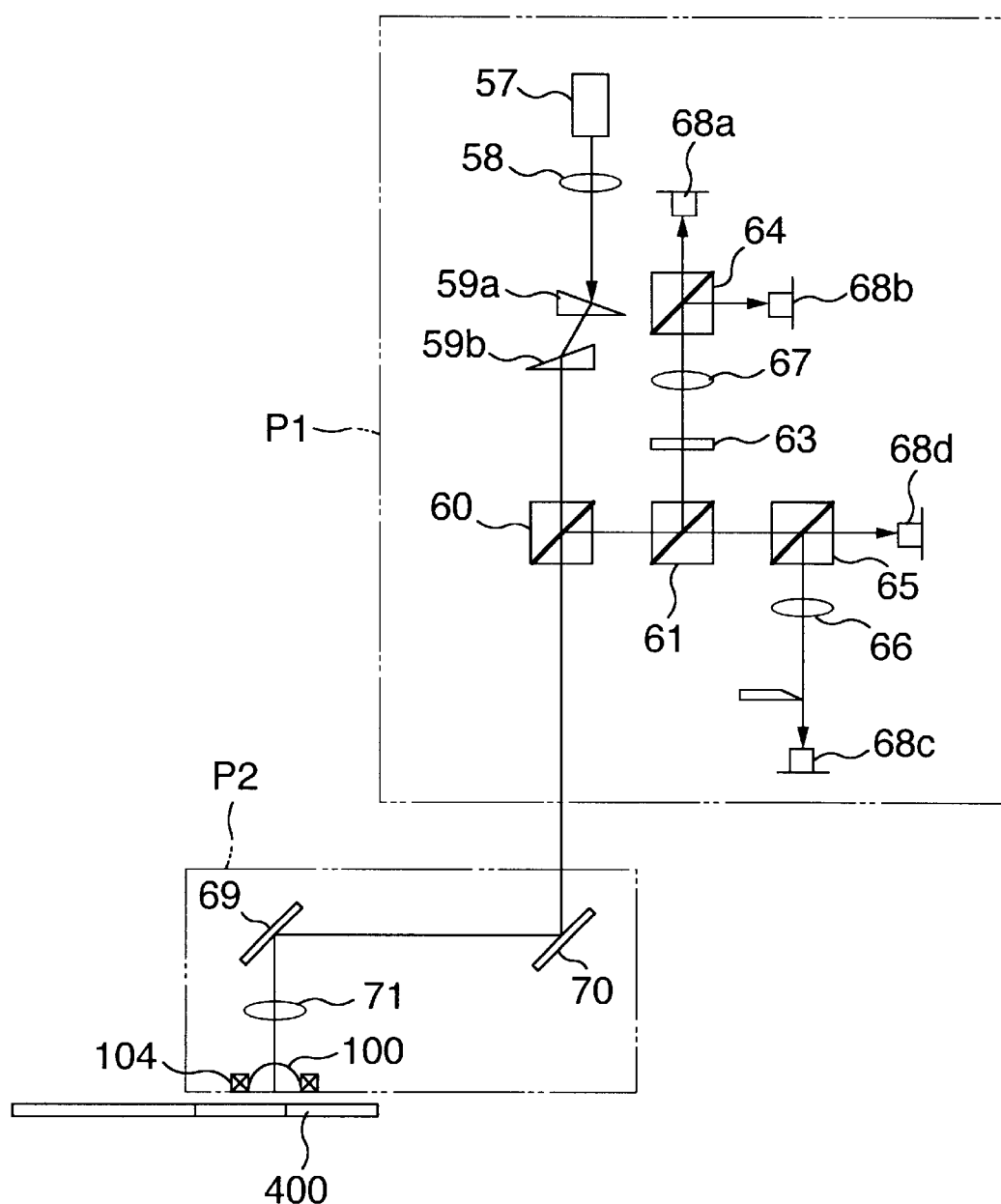
FIG. 3 schematically shows an optical system of a magneto-optical recording apparatus used in random seeking test.

Then, the magneto-optical recording media of Examples 1–5 and Comparative Examples 1 and 2 were subjected to random seeking test. The results of the test were evaluated by the increase in the number of defects after the random seeking test. The optical system of the apparatus used for the measurement is shown in FIG. 3. FIG. 3 shows the optical system in the case of magneto-optical recording apparatus. In FIG. 3, as the fixed optical system, there may be used the same optical system as of the drive for carrying out recording and reproducing of general magneto-optical recording media. That is, a laser beam emitted from laser beam source 57 passes through lens 58, prisms 59a and 59b, and beam splitter 60, is reflected by mirrors 70 and 69, then is projected into objective lens 71, furthermore, is condensed by solid immersion lens (SIL) 100, and is focalized at the bottom face of SIL 100. The beam which oozes out from the bottom face of SIL 100 is projected into magneto-optical recording medium 400 from the side of the lubricating layer and reaches the recording layer to form magnetic marks corresponding to the recording signals in the recording layer. At the time of recording, a recording magnetic field is applied to the magneto-optical recording medium 400 by magnetic coil 104, and recording can be performed by any of light modulation system, magnetic field modulation system, and light and magnetic field modulation system.

At the time of reproduction, the reflected beam from the magneto-optical recording medium 400 is reflected by mirrors 69 and 70, and then reflected by beam splitter 60 and split by beam splitter 61 into two beams going toward the two beam splitters 64 and 65. The reflected beam projected into the beam splitter 65 is further split there and the split beams are projected into focusing detector 68c and tracking signal detector 68d, respectively. The reflected beam projected into the beam splitter 64 through ½ wavelength plate 63 and lens 67 is projected into beam detectors 68a and 68b which detect the beams of polarized components falling at right angles with each other, and the reproduction signals are detected.

The random seeking test method measures the increase in the number of defects before and after random seeking of 100,000 times. Patterns comprising relatively long recording marks of 1 μm in mark length were written in all tracks (12500 tracks) between 30 and 40 mm in radius and these were reproduced. In this case, the portions in which the amplitude of the resulting magneto-optical signals was 65% or more were defined to be defects. In order to prevent dusts in peripheral environment from sticking onto the medium to produce defects during measurement, the measurement was conducted in a measuring room of 100 in cleanliness, and the magneto-optical recording apparatus per se used in measurement was covered by a clean booth. The number of increasing defects was obtained by the following formula.

The number of increasing defects=(the number of defects after random seeking)–(the number of defects before random seeking)

The results of random seeking test (increase in the number of defects) on the magneto-optical recording media of Examples 1–5 and Comparative Examples 1 and 2 are shown in Table 7.

TABLE 7

|  | The number of increasing defects |
| --- | --- |
| Example 1 | 325 |
| Example 2 | 354 |
| Example 3 | 425 |
| Example 4 | 298 |
| Example 5 | 334 |
| Comparative Example 1 | 896 |
| Comparative Example 2 | 1241 |

In the random seeking test on the magneto-optical recording media of Comparative Examples 1 and 2, the optical head after random seeking of 100,000 times was observed to find that a large amount of the lubricant stuck to the light emitting face of SIL. In the magneto-optical recording media of Comparative Examples 1 and 2 according in which a large amount of the lubricant stuck to the light emitting face of SIL, the number of defects increased as can be seen from the results of Table 7. Especially, in the magneto-optical recording medium of Comparative Example 2, the defects conspicuously increased, and it is considered that this is because the lubricant sticking to the light emitting face of the optical head was heat-decomposed by heating with laser beam irradiation to deteriorate light transmittance.

Next, a specific explanation will be made of examples of the optical recording media according to the second embodiment of the present invention.

Example 11

Samples 1–6 were produced in the same manner as in Production Examples 1–6. A perfluoro polyether lubricant (i) having —$(C_2F_4O)_n(CF_2O)_m$— as a main chain and two hydroxyl groups in each of both end groups of the molecule and represented by the formula: $HO—CH_2CH(OH)CH_2OCH_2CF_2O—(C_2F_4O)_n—(CF_2O)_m—CF_2CH_2OCH_2CH(OH)CH_2OH$ was coated on the protective layer of each sample at a thickness of 2 nm by a dip coater to form a lubricating layer. The perfluoro polyether lubricant (i) having the above formula had an average molecular weight of 4000.

Example 12

Samples 1–6 were produced in the same manner as in Production Examples 1–6. A perfluoro polyether lubricant (j) having a main chain of $F(C_3F_6O)_p$— and having two hydroxyl groups in one end group of the molecule and represented by $F(C_3F_6O)_p—C_2F_4CH_2OCH_2CH(OH)CH_2OH$ was coated on the protective layer of each sample at a thickness of 2 nm by a dip coater to form a lubricating layer. The perfluoro polyether lubricant (j) having the above formula had an average molecular weight of 7000.

Comparative Example 3

A perfluoro polyether lubricant having —$(C_2F_4O)_n(CF_2O)_m$— as a main chain and one hydroxyl group in each of both end groups of the molecule and represented by the formula: $HO—CH_2CF_2O—(C_2F_4O)_n—(CF_2O)_m—CF_2CH_2OH$ was coated on the protective layer of each of the magneto-optical recording media obtained in Production Examples 1–6 at a thickness of 2 nm by a dip coater to form a lubricating layer. This perfluoro polyether lubricant was obtained in the trademark of Fomblin-Z-DOL from Audimont Co., Ltd. and had an average molecular weight of 4000.

Comparative Example 4

A perfluoro polyether having a main chain of $F(C_3F_6O)_p$— and having one hydroxyl group in one of end groups of the molecule and represented by $F(C_3F_6O)_p—C_2F_4CH_2OH$ was coated on the protective layer of each of the magneto-optical recording media obtained in Production Examples 1–6 at a thickness of 2 nm by a dip coater to form a lubricating layer. This perfluoro polyether had an average molecular weight of 7000.

Measurement of thickness of the lubricating layer and calculation of the lubricant bonding rate Thickness of the lubricating layer of the magneto-optical recording media produced in Examples 11 and 12 and comparative Examples 3 and 4 was measured using XPS in the same manner as in measurement on the magneto-optical recording media of Examples 1–5, and the lubricant bonding rate was also calculated in the same manner as in the calculation on the recording media of Examples 1–5. The results are shown in Table 8.

TABLE 8

|  | A (nm) | B (nm) | B/A × 100% |
|---|---|---|---|
| Example 11 | 2.00 | 0.92 | 46 |
| Example 12 | 2.00 | 0.82 | 41 |
| Comparative Example 3 | 2.00 | 0.40 | 20 |
| Comparative Example 4 | 2.00 | 0.36 | 18 |

Since the lubricants used in the magneto-optical recording media of Examples 11 and 12 had two hydroxyl groups in one or both end groups of the molecule, they were high in adsorption to the carbon protective film and showed a lubricant bonding rate of 40% or higher. On the other hand, since the lubricants used in the magneto-optical recording media of Comparative Examples 3 and 4 had only one hydroxyl group in one or both end groups of the molecule, they were low in adsorption to the carbon protective film and showed a low lubricant bonding rate of about 20%.

The Sliding Test Conditions and Test Environment

Next, the magneto-optical recording media obtained in Examples 11 and 12 and Comparative Examples 3 and 4 were subjected to sliding test using a steel ball. The slider used was a high-carbon Cr steel ball of ¼ inch in diameter, and the sliding test was conducted under the conditions of 5 g in load, 2 cm in sliding width and 2 m/min (50 cycles/min) in average sliding speed. The test environment was set at 25° C., 35%RH. Table 9 shows coefficient of friction after sliding of 50 cycles on the magneto-optical recording media obtained in Examples 11 and 12 and Comparative Examples 3 and 4, and the number of sliding before the surface of the media got sliding scratches.

TABLE 9

|  | Coefficient of friction | The number of sliding before sliding scratches occurred. |
|---|---|---|
| Example 11 | 0.22 | >10000 |
| Example 12 | 0.24 | >10000 |
| Comparative Example 3 | 0.40 | 230 |
| Comparative Example 4 | 0.50 | 150 |

It can be seen from the results of Table 8 and Table 9 that the magneto-optical recording media of Examples 3 and 4 in which adsorption of the lubricant molecules was great and the lubricant bonding rate was high was lowered in coefficient of friction after sliding of 50 cycles and were much improved in sliding resistance as compared with the magneto-optical recording media of Comparative Examples 3 and 4 in which adsorption of the lubricant molecules was small and the lubricant bonding rate was low.

Example 13

The magneto-optical recording media produced in the same manner as in Example 11 and 12 were heat treated at 100° C. for 2 hours in the air atmosphere using a thermostatic chamber.

Example 14

The surface of the magneto-optical recording media produced in the same manner as in Example 11 and 12 was irradiated with ultraviolet ray for 5 minutes in the air atmosphere using a low-pressure mercury lamp emitting an ultraviolet ray of 254 nm in wavelength. The irradiation power of the ultraviolet ray was 200 W.

Example 15

The surface of the magneto-optical recording media produced in the same manner as in Example 11 and 12 was irradiated with ultraviolet rays for 5 minutes in a nitrogen atmosphere using a low-pressure mercury lamp emitting ultraviolet rays of 185 nm and 254 nm in wave-length. The irradiation power of the ultraviolet rays was 200 W.

Example 16

The surface of the magneto-optical recording media produced in the same manner as in Example 11 and 12 was irradiated with ultraviolet ray for 5 minutes in the air atmosphere using a low-pressure mercury lamp emitting an ultraviolet ray of 254 nm in wavelength under heating at 100° C. using an infrared lamp. The irradiation power of the ultraviolet ray was 200 W.

Example 17

The surface of the magneto-optical recording media produced in the same manner as in Examples 11 and 12 was irradiated with ultraviolet rays for 5 minutes in a nitrogen atmosphere using a low-pressure mercury lamp emitting ultraviolet rays of 185 nm and 254 nm in wave-length under heating at 100° C. using an infrared lamp. The irradiation power of the ultraviolet ray was 200 W. Thus, magneto-optical recording media according the second embodiment of the present invention were obtained.

Thickness of the lubricating layer of the magneto-optical recording media obtained in Examples 13–17 was measured using XPS in the same manner as in measurement on the magneto-optical recording media obtained in Examples 1–5, and the lubricant bonding rate was also calculated in the same manner as in the calculation on the recording media of Examples 1–5. The results are shown in Table 10. It can be seen that lubricant bonding rates of 60% or higher were obtained in all of the magneto-optical recording media obtained in Examples 13–17.

TABLE 10

|  | A (nm) | B (nm) | B/A × 100% |
| --- | --- | --- | --- |
| Example 13 | 2.00 | 1.20 | 60 |
| Example 14 | 2.00 | 1.30 | 65 |
| Example 15 | 2.00 | 1.40 | 70 |
| Example 16 | 2.00 | 1.42 | 71 |
| Example 17 | 2.00 | 1.56 | 78 |

The magneto-optical recording media obtained in Examples 11–17 were subjected to a recording and reproducing test for continuously 24 hours with carrying out seeking by a floating type slider on which a solid immersion lens (SIL) made of zirconia and having a diameter of 80 $\mu$m and a refractive index of 2.2 was mounted. The height of the floating type slider from the surface of the media was kept at about 100 nm. After termination of the recording and reproducing test, the state of contamination of the light emitting face of SIL and the state of scratches (by sliding) on the surface of the media were examined by a light microscope.

No sticking of the lubricant to SIL was recognized and the number of scratches on the media was less than 20 in the magneto-optical recording media subjected to heat treatment or irradiation with ultraviolet rays and enhanced in lubricant bonding rate to 60–100% (Examples 13–17). On the other hand, in the magneto-optical recording media which were not subjected to heat treatment or irradiation with ultraviolet rays (Examples 11 and 12), the number of scratches on the media was small, but a small amount of the lubricant stuck to a part of the light emitting face of SIL. In the magneto-optical recording media of Examples 11 and 12, the lubricant bonding rate was about 40% as shown in Table 8, and physical adsorptive lubricant layer was present in a larger amount than in the magneto-optical recording media of Examples 13–17 (60% or higher in lubricant bonding rate). As a result, some amount of the lubricant stuck to the slider surface of the floating type head and the light emitting face of SIL. The results are shown in Table 11.

TABLE 11

| Medium | Contamination of SIL | Scratches on the medium (number) |
| --- | --- | --- |
| Magneto-optical recording medium obtained in Example 11 | A small amount of lubricant stuck to a part of light emitting face of SIL | 17 |
| Magneto-optical recording medium obtained in Example 12 | A small amount of lubricant stuck to a part of light emitting face of SIL | 18 |
| Magneto-optical recording medium obtained in Example 13 | No | 18 |
| Magneto-optical recording medium obtained in Example 14 | No | 15 |
| Magneto-optical recording medium obtained in Example 15 | No | 13 |
| Magneto-optical recording medium obtained in Example 16 | No | 14 |
| Magneto-optical recording medium obtained in Example 17 | No | 16 |

The optical recording media and the process for producing the same of the present invention are specifically explained above. The optical recording media of the present invention are not limited to magneto-optical recording media, but can be applied to optional optical recording media such as phase-change type optical recording media, write once type optical recording media having organic dyes in the recording layer, and read only type optical recording media. For example, in the case of the phase-change type optical recording media, the construction can comprise a substrate and, provided thereon in succession, a reflective layer, a dielectric layer, a recording layer, a dielectric layer, a protective layer and a lubricating layer which is according to the present invention. Specifically, the construction can be substrate/AlTi/ZnS+SiO$_2$/GeSbTe/ZnS+SiO$_2$/carbon/lubricant.

In the optical recording media according to the first embodiment of the present invention, a lubricating layer of 60–100% in lubricant bonding rate is formed on the protective layer, whereby the lubricant is inhibited or prevented from sticking to the light emitting face of SIL at the time of carrying out recording and reproduction using a floating type optical head on which SIL is mounted, and thus recording and reproduction using SIL can be realized.

In the optical recording media of the present invention, adsorption of lubricant to the carbon protective film is enhanced by using as the lubricant a perfluoro polyether having two or more hydroxyl groups in one or both end groups and having a molecular weight of 2000–10000, and thus sliding resistance of the optical recording media can be increased. As a result, the lubricant can be prevented from sticking to the slider surface and the light emitting face of the floating type optical head.

In the process for producing the optical recording media according to the present invention, a lubricant is coated on the protective layer and then heated or irradiated with ultraviolet rays to increase the lubricant bonding rate of the lubricating layer to 60% or more. Using the resulting optical recording media, recording and reproduction of continuously 24 hours can be performed without damaging the media. Furthermore, a lubricant bonding rate of 80% or more can be obtained by subjecting the media to rinsing with a solvent in addition to the heating or irradiation with ultraviolet rays. Therefore, the process of the present invention is suitable as a process for producing an optical recording medium subjected to recording and reproduction using a floating type optical head on which an SIL is mounted.

What is claimed is:

1. An optical recording medium comprising a substrate and, provided thereon in succession, a reflective layer, a recording layer, a protective layer and a lubricating layer comprising a lubricant, where a lubricant bonding rate of the lubricant to the protective layer is 60–100%;
   wherein the optical recording medium is irradiated with light from the side of the lubricating layer by a floating type optical head to carry out at least one of recording and reproduction, and
   wherein the lubricant is a perfluoro polyether having at least one functional group selected from the group consisting of an alcohol group, a carboxyl group, an ester group and a piperonyl group at one or both ends of the molecule and having a molecular weight of 2000–10000.

2. An optical recording medium according to claim 1, wherein the protective layer comprises carbon.

3. An optical recording medium according to claim 2, wherein the carbon contains at least one element selected from the group consisting of hydrogen, nitrogen, silicon and fluorine.

4. An optical recording medium according to claim 3, wherein the lubricant bonding rate is 80–100%.

5. An optical recording medium according to claim 1, which is a magneto-optical recording medium.

6. An optical recording medium according to claim 1, wherein the floating type optical head is provided with a solid immersion lens.

7. An optical recording medium according to claim 6, wherein the floating type optical head is further provided with a magnetic coil for applying a magnetic field to the optical recording medium.

8. An optical recording medium according to claim 1, wherein the lubricant is a perfluoro polyether in which at least one end group of the molecule has two or more hydroxyl groups.

9. An optical recording medium according to claim 8, wherein the lubricant has a molecular weight of 2000–10000.

10. An optical recording medium according to claim 9, wherein the lubricant is a perfluoro polyether represented by HO—$CH_2CH(OH)CH_2OCH_2CF_2O$—$(C_2F_4O)_n$—$(CF_2O)_m$—$CF_2CH_2OCH_2CH(OH)CH_2OH$.

11. An optical recording medium comprising a substrate and, provided thereon in succession, a reflective layer, a recording layer, a protective layer and a lubricating layer comprising a lubricant, where the lubricant is a perfluoro polyether in which at least one end group of the molecule has two or more hydroxyl groups.

12. An optical recording medium according to claim 11, wherein the lubricant has a molecular weight of 2000–10000.

13. An optical recording medium according to claim 12, wherein the lubricant is a perfluoro polyether represented by HO—$CH_2CH(OH)CH_2OCH_2CF_2O$—$(C_2F_4O)_n$—$(CF_2O)_m$—$CF_2CH_2OCH_2CH(OH)CH_2OH$.

14. An optical recording medium according to claim 11, wherein the lubricant bonding rate of the lubricant to the protective layer is 60–100%.

15. An optical recording medium according to claim 14, wherein the protective layer comprises carbon.

16. An optical recording medium according to claim 15, wherein the carbon protective layer contains at least one element selected from the group consisting of hydrogen, nitrogen, silicon and fluorine.

17. An optical recording medium according to claim 11, which is irradiated with light from the side of the lubricating layer by a floating type optical head to carry out at least one of recording and reproduction.

18. An optical recording medium according to claim 17, wherein the floating type optical head is provided with a solid immersion lens.

19. An optical recording medium according to claim 18, wherein the floating type optical head is further provided with a magnetic coil for applying a magnetic field to the optical recording medium.

20. An optical recording medium according to claim 19, wherein the lubricant bonding rate of the lubricant to the protective layer is 60–80%.

21. An optical recording medium according to claim 11, which is a magneto-optical recording medium.

22. A process for producing an optical recording medium comprising a substrate and, provided thereon in succession, a reflective layer, a recording layer, a protective layer and a lubricating layer, which comprises coating a lubricant on the protective layer and thereafter subjecting the lubricant to at least one of heating or irradiation with ultraviolet ray so that the lubricant bonding rate of the lubricant to the protective layer is in the range of 60–100%.

23. A process according to claim 21, wherein the lubricant is a perfluoro polyether in which at least one end group of the molecule has two or more hydroxyl groups.

24. A process according to claim 23, wherein the lubricant has a molecular weight of 2000–10000.

25. A process according to claim 24, wherein the lubricant is a perfluoro polyether represented by HO—$CH_2CH(OH)CH_2OCH_2CF_2O$—$(C_2F_4O)_n$—$(CF_2O)_m$—$CF_2CH_2OCH_2CH(OH)CH_2OH$.

26. A process according to claim 23, wherein the temperature for the heating is in the range of 50–120° C.

27. A process according to claim 23, wherein the ultraviolet ray used for the irradiation has a wavelength of 185–254 nm.

28. A process according to claim 22, which additionally comprises rinsing the lubricating layer with a solvent after carrying out at least one of the heating and the irradiation with ultraviolet rays.

29. A process according to claim 28, wherein the solvent is at least one solvent selected from the group consisting of perfluorooctane, perfluorohexane, $C_4F_9OCH_3$, $C_4F_9OC_2H_5$ and GARDEN.

30. A process according to claim 27, wherein the irradiation with ultraviolet rays is carried out in an inert atmosphere.

31. A process according to claim 30, wherein the inert atmosphere is an atmosphere selected from the group consisting of nitrogen atmosphere, argon atmosphere and helium atmosphere.

32. A process according to claim 22, wherein the optical recording medium is a magneto-optical recording medium.

33. A process according to claim 22, wherein the resulting optical recording medium is irradiated with light from the side of the lubricating layer by a floating type optical head to carry out at least one of recording and reproduction.

34. A process according to claim 33, wherein the floating type optical head is provided with a solid immersion lens.

35. A process according to claim 34, wherein the floating type optical head is further provided with a magnetic coil for applying a magnetic field to the optical recording medium.

36. An optical recording medium produced by the process of claim 22.

* * * * *